United States Patent
Fink et al.

(10) Patent No.: US 6,941,361 B1
(45) Date of Patent: Sep. 6, 2005

(54) METHOD AND APPARATUS FOR OBTAINING INVENTORY AND USER INFORMATION FOR A REMOTE COMPUTER DEVICE

(75) Inventors: Paul Ernest Fink, Mendham, NJ (US); Marc A. Henness, Saylorsburg, PA (US); Walt Szablowski, Newtown, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 605 days.

(21) Appl. No.: 09/384,116

(22) Filed: Aug. 26, 1999

(51) Int. Cl.$^7$ .............................................. G06F 15/173
(52) U.S. Cl. ...................................... 709/223; 709/224
(58) Field of Search ........................... 714/38; 707/10; 345/733; 709/221, 223, 224

(56) References Cited

U.S. PATENT DOCUMENTS

| | | | | | |
|---|---|---|---|---|---|
| 5,805,897 | A | * | 9/1998 | Glowny | 709/221 |
| 6,047,129 | A | * | 4/2000 | Frye | 709/221 |
| 6,098,098 | A | * | 8/2000 | Sandahl et al. | 709/221 |
| 6,182,134 | B1 | * | 1/2001 | Collins et al. | 345/733 |
| 6,205,445 | B1 | * | 3/2001 | Tokuyama | 707/10 |
| 6,338,149 | B1 | * | 1/2002 | Ciccone et al. | 714/38 |

OTHER PUBLICATIONS

"Methodology Summary" downloaded from www.cti.ca/y2k/Methodology_Summary%281%29.htm on Aug. 24, 1999.

Tim Wilson, "Network Associates Takes Y2K Software Beyond 2000," Internet Week, downloaded from www.techweb.com/wire/story/y2k/TWB19990128S0011 (Jan. 28, 1999).

George Black, "Save Money Through Asset Management" downloaded from www.datamation.com/PlugIn/issues/1996.april1/04adesk2.html on Aug. 24, 1999.

Systems Management Server 3rd Party Products downloaded from www.technet.microsoft.com/CDONLINE/CONTENT/COMPLETE/BOES/BO/SMS/YPAGES/MG-MTPRD.HTM on Aug. 24, 1999.

"Tally Systems Helps Save on Taxes With PC Asset Management" downloaded from www.ukbusinessnet.com/ir/editorial/1674.htm on Aug. 24, 1999, (Mar. 3, 1998).

"Tally Systems' NetCensus Integrates with IT Map 2000 for Y2K" downloaded from www.netinfobuilder.com/tally/y2k/pr012998.html, Jan. 29, 1998.

(Continued)

*Primary Examiner*—Le Hien Luu

(57) ABSTRACT

A method and apparatus are disclosed for remotely identifying the user of a computer connected to a network and associating the user with recorded inventory information. A unique user handle or username is used to identify a user associated with a particular network node. The user handle is used to access a user profile, such as a record in a corporate directory database, before an inventory scan is performed. The information recorded in the user profile is linked to inventory information obtained during an inventory scan of a network node. The user identification can be verified by presenting the retrieved personal record to the user to confirm that the record actually corresponds to the user and that the information contained therein is accurate. The present invention supplements the recorded inventory information associated with a conventional inventory scan with personal information corresponding to the user associated with the network node. Thus, the present invention allows inventory information to be reported or searched based on user criteria or personal information, such as identifying the number of network nodes in a business group that are non-compliant or otherwise requiring an upgrade, replacement or additional servicing.

30 Claims, 6 Drawing Sheets

OTHER PUBLICATIONS

"Tally Systems" PR/UK—What is PC Asset Management downloaded from www.tallysys.com/tally/press/pr/puasset.html (1998).

"Audit +Plus, Comprehensive Software Auditing" downloaded from www.computingedge.com/pluspack/index.htm on Aug. 25, 1999.

"Audit +Plus" downloaded from www.guisoft.com.au/AuditPlus/, Copyright 1996–1997.

"Audit +Plus 3.1 Available Now" downloaded from www.computingedge.com/PressReleases/Audit31and 300Plus.htm, Apr. 9, 1999.

Salvatore Salamone "Computer Asset Management, Using Automatic Hardware and Software Systems Can Simplify Administration and Save Money" downloaded from www.byte.com/art/9509/sec6/art1.htm (Sep. 1995).

"Asset Management Software EuroMan 4.0 for Windows" downloaded from www.eurotek.co.uk/assetman.htm on Aug. 24, 1999.

"Government Information Technology Agency (GITA) Asset Management Program (AMP)" downloaded from www.gita.state.az.us/Planning/amp/Asset_Management_Program.htm on Aug. 24, 1999.

"Government Information Technology Agency (GITA) Automated IT Inventory" downloaded from www.gita.state.az.us/Planning/amp/discbit2.htm on Aug. 24, 1999.

"Audit +Plus—Check out *300 +Plus Suite* for the most comprehensive software asset management for Windows!" downloaded from www.computingedge.com/pluspack/audplus.htm Jun. 18, 1999.

Matt Hamblen, "Y2K Silver Lining" downloaded from www.computerworld.com/home/news.nsf/CWFlash/ 9905285desk, May 28, 1999.

"The Source—Invesco To Use Tally Systems' PC Asset Management Software to Beat the Bug" downloaded from www.thesource.dwpub.com/frames/1999/02/2411.html, Feb. 17, 1999.

* cited by examiner

FIG. 4

MACHINE INVENTORY DATABASE 400

| MACHINE IDENTIFIER (440) | USER HANDLE (450) | USER NAME (460) | USER CONTACT INFORMATION (470) | USER AFFILIATIONS (480) | MACHINE NAME/IP ADDRESS (485) | PROCESSOR INFO (490) | OS INFO (495) |
|---|---|---|---|---|---|---|---|
| (405) | | | | | | | |
| (410) | | | | | | | |
| (415) | | | | | | | |
| ... | ... | ... | ... | ... | ... | ... | ... |
| (420) | | | | | | | |

FIG. 5

BIOS INFORMATION DATABASE 500

| MACHINE IDENTIFIER (540) | BIOS DATE (550) | MACHINE MAKE/MODEL (560) | REVISION (570) | RETRIEVED STRINGS (580) | MATCHED STRINGS (585) | CHECKSUM (590) | BIOS SIGNATURE (595) |
|---|---|---|---|---|---|---|---|
| (505) | | | | | | | |
| (510) | | | | | | | |
| (515) | | | | | | | |
| ... | ... | ... | ... | ... | ... | ... | ... |
| (520) | | | | | | | |

HARDWARE AUDIT TABLE 600

| MAKE (640) | MODEL NUMBER (650) | DESCRIPTION (660) | BIOS SIGNATURE (670) | COMPLIANT STATUS (680) | RECOMMENDATIONS (690) | CURRENT BIOS DATE (695) |
|---|---|---|---|---|---|---|
| | | | | | | |
| | | | | | | |
| | | | | | | |

MACHINE TEST RESULTS 700

| MACHINE IDENTIFIER (740) | MACHINE TEST (750) | TEST RESULT (760) |
|---|---|---|
| | | |
| | | |
| | | |

METHOD AND APPARATUS FOR OBTAINING INVENTORY AND USER INFORMATION FOR A REMOTE COMPUTER DEVICE

CROSS REFERENCE TO RELATED APPLICATIONS

The present invention is related to U.S. patent application Ser. No. 09/383,420 entitled "Method and Apparatus for Identifying Computer Hardware Using a Bios Signature," now abandoned, and U.S. patent application Ser. No. 09/384,117 entitled "Method and Apparatus for Remotely Assessing Software With Automatic Maintenance of a Software Audit File," U.S. Pat. No. 6,574,724 filed contemporaneously herewith, assigned to the assignee of the present invention and incorporated by reference herein.

FIELD OF THE INVENTION

The present invention relates to a distributed computing system, and more particularly to the remote identification, assessment and management of network elements in a distributed computing system.

BACKGROUND OF THE INVENTION

The resources and computation tasks in a computing system are frequently spread among a plurality of network nodes to form a distributed computing system. When centralized resources are shared by a plurality of users in a distributed system, their costs are distributed over a larger user base. In addition, the centralization of shared resources makes the administration and maintenance of these resources more efficient and also potentially more reliable due to the possibility of a centralized backup mechanism. Furthermore, the redundancy provided by most distributed computing environments improves the ability to recover from a failure by allowing processing tasks to continue on an alternate device upon a detected failure.

While the centralization of shared resources potentially makes the administration and maintenance of network elements more efficient and reliable, the increasing diversity of network elements in distributed computing systems provides additional challenges for network management systems that attempt to manage network resources in a uniform manner. In a large network environment, for example, the task of maintaining an inventory of the connected personal computers and workstations, as well as the software installed on each machine, can be overwhelming.

Thus, a number of automated system management tools are available to remotely inventory computers connected in a network environment. Such system management tools periodically survey each computer and gather hardware and software inventory data by scanning the desktop environment. For example, the System Management Server (SMS)™, commercially available from Microsoft Corporation of Redmond, Wash., inventories the computers connected to a network, and the software installed on each computer. The hardware and software inventories generated by the Microsoft SMS tool can be utilized, for example, to identify computers requiring an upgrade or another reconfiguration.

In addition, the hardware and software inventories generated by such system management tools allow known configuration risks, such as a particular virus or a failure to comply with a particular problem, such as the "Year 2000" or "Euro" problems, to be remotely evaluated and remedied or reduced. In this manner, the compliance of each computer with identified risks can be evaluated to determine whether any further remedial work is required.

While such commercially available system management tools assist with the task of obtaining an inventory of hardware and software in a network environment, they suffer from a number of limitations, which if overcome, could greatly expand the utility of such system management tools. For example, currently available system management tools are unable to reliably and automatically identify the user of a particular computer. Thus, a need exists for a method and apparatus that automatically identifies the user of a computer connected to a network and associates the user with recorded inventory information.

SUMMARY OF THE INVENTION

Generally, a method and apparatus are disclosed for remotely identifying the user of a computer connected to a network and associating the user with recorded inventory information. A user handle, or another network log-in identifier that uniquely identifies a network user, is obtained during the log-in process and is used to identify a user associated with a particular network node. The user handle is used to access a user profile, such as a record in a corporate directory database, before an inventory scan is performed. The information recorded in the user profile is linked to inventory information obtained during an inventory scan of a network node. In one embodiment, the user identification is verified using the retrieved personal information. For example, the retrieved personal record associated with the entered user handle can be presented to the user to confirm that the record actually corresponds to the user and that the information contained therein is accurate.

Thus, the present invention supplements the recorded inventory information associated with a conventional inventory scan with personal information corresponding to the user associated with the network node. Thus, the present invention allows inventory information to be reported or searched based on user criteria or personal information. For example, if the personal records identify a business group, such as a corporate department, associated with the corresponding user, the linked inventory and personal information can be searched to identify the number of network nodes in a business group requiring an upgrade, replacement or additional servicing. In addition, the linked inventory and personal information can be searched to identify and report the number of network nodes in a business group that fail to comply with a particular issue, such as the "Year 2000" or "Euro" problems.

A more complete understanding of the present invention, as well as further features and advantages of the present invention, will be obtained by reference to the following detailed description and drawings.

BRIEF DESCRIPTION OF THE DRAWINGS

FIG. 4 is a sample table from an exemplary machine inventory database of FIG. 2;

FIG. 5 is a sample table from an exemplary a BIOS information database of FIG. 2;

FIG. 6 is a sample table from an exemplary hardware audit table of FIG. 2;

FIG. 7 is a sample table from an exemplary machine test results database of FIG. 2.

DETAILED DESCRIPTION

Figure 1:
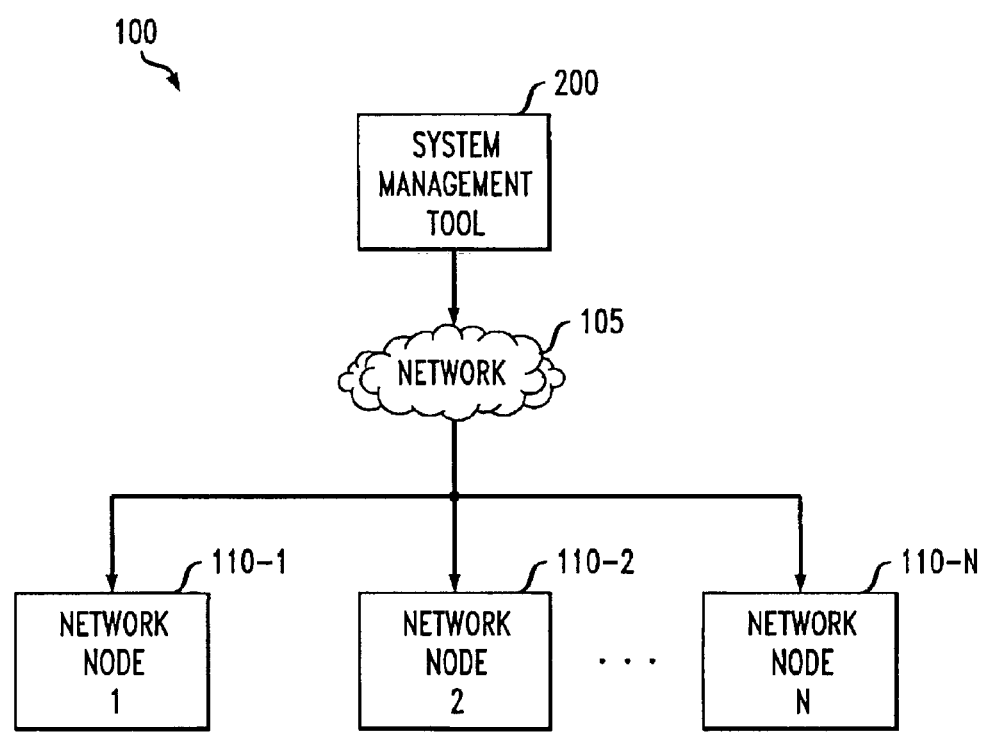
FIG. 1 illustrates a network environment that interconnects a number of network nodes and a system management tool (SMT) in accordance with the present invention.

FIG. 1 illustrates a network environment 100 that includes a number of network nodes 110-1 through 110-N (hereinafter, collectively referred to as network nodes 110) and a system management tool (SMT) 200, discussed further below in conjunction with FIG. 2, interconnected by a network 105, such as a local area network (LAN) or a wide area network (WAN). The network nodes 110 may be embodied, for example, as workstations, personal computers, servers or routers.

According to one feature of the present invention, a user handle, such as a network username, password or another network log-in identifier that uniquely identifies a network user, is used by the system management tool (SMT) 200 to identify a user associated with a particular network node 110. In one implementation, the system management tool (SMT) 200 utilizes the user handle to access a user profile (record) before the inventory scan is performed. The information recorded in the user profile is linked to the recorded inventory information. In a further variation, the user identification is verified using the retrieved personal information, such as a record in a corporate directory database. In other words, the retrieved personal record associated with the entered user handle is presented to the user to confirm that the record actually corresponds to the user and that the information contained therein is accurate.

According to a further feature of the present invention, the recorded inventory information associated with a conventional inventory scan may be supplemented with personal information corresponding to the user associated with the network node 110. In this manner, inventory information may be reported or searched based on user criteria or personal information. For example, if the personal records identify a business group, such as a corporate department, associated with the corresponding user, the linked inventory and personal information can be searched to identify the number of network nodes 110 in a business group requiring an upgrade, replacement or additional servicing. In addition, the linked inventory and personal information can be searched to identify and report the number of network nodes 110 in a business group that fail to comply with a particular issue, such as the "Year 2000" or "Euro" problems.

Figure 2:
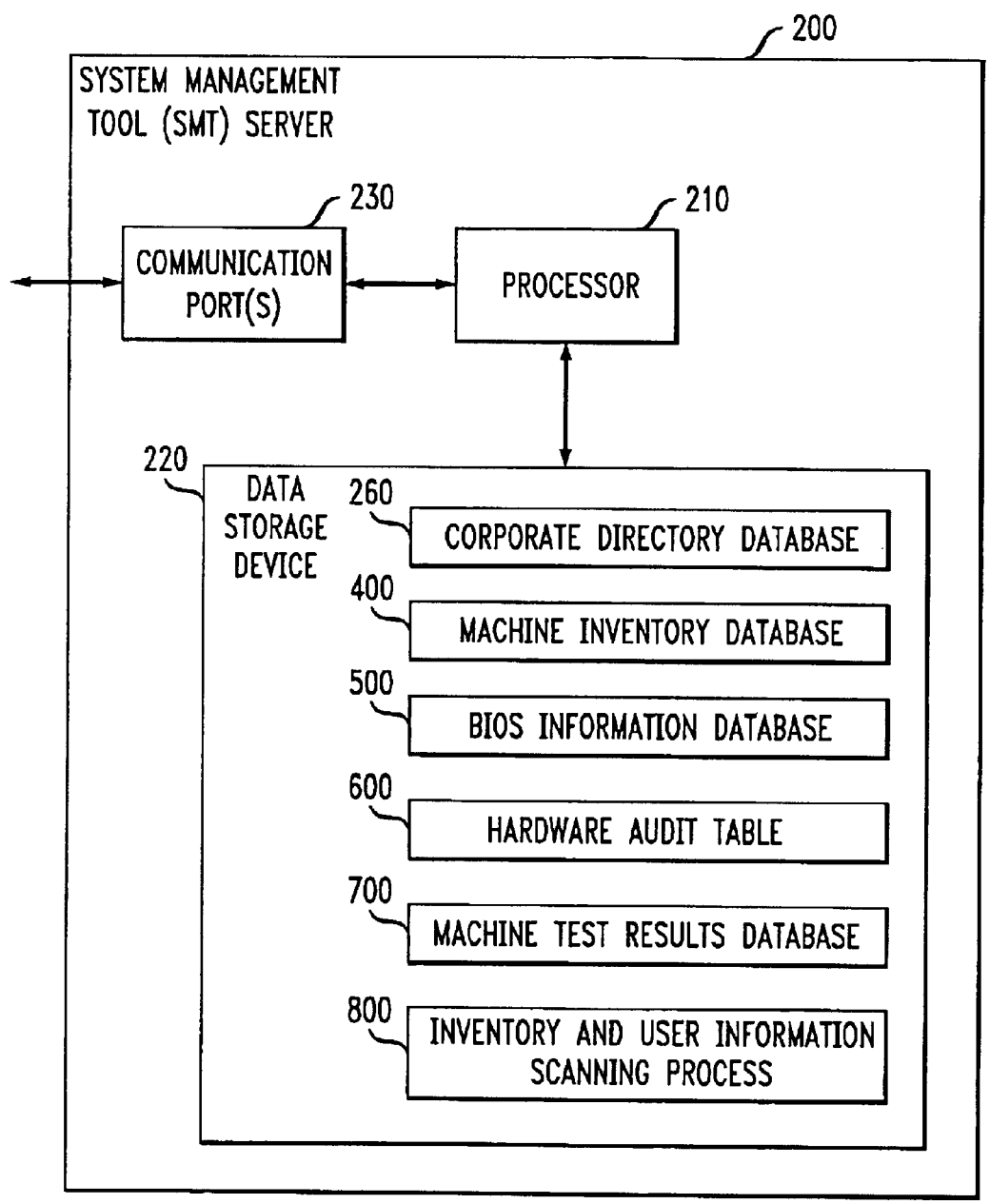
FIG. 2 is a schematic block diagram of an illustrative system management tool (SMT) server of FIG. 1.

FIG. 2 is a schematic block diagram of an illustrative system management tool (SMT) server 200. As shown in FIG. 2, the system management tool (SMT) server 200 includes certain hardware components, such as a processor 210, a data storage device 130, and one or more communications ports 230. The processor 210 can be linked to each of the other listed elements, either by means of a shared data bus, or dedicated connections, as shown in FIG. 2. The communications port(s) 230 allow(s) the system management tool (SMT) server 200 to communicate with the network nodes 110 over the network 105.

Figure 8:
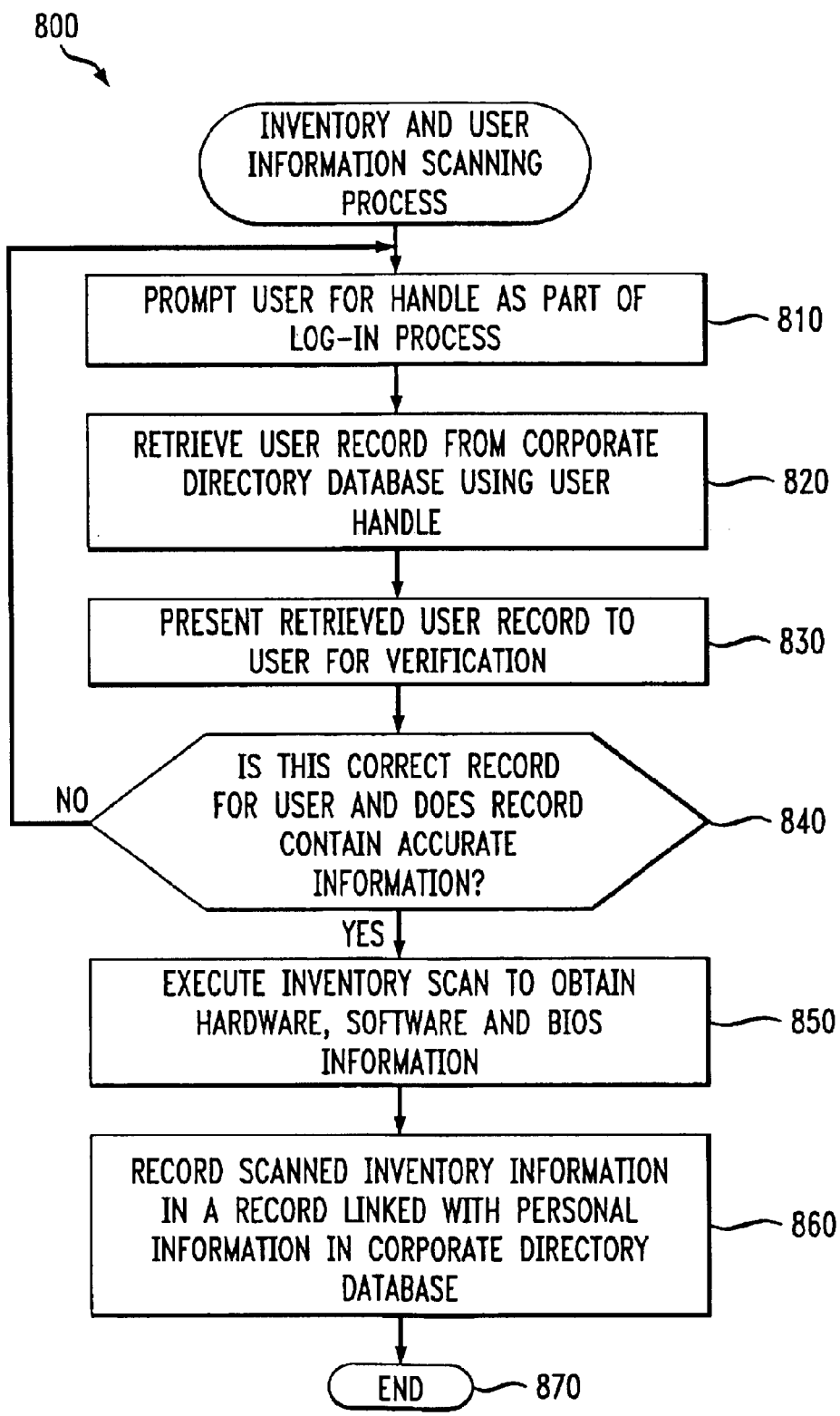
FIG. 8 is a flow chart describing an exemplary inventory and user information scanning process executed by the system management tool (SMT) server of FIG. 2.

The data storage device 220 is operable to store one or more instructions, discussed further below in conjunction with FIG. 8, which the processor 210 is operable to retrieve, interpret and execute in accordance with the present invention. The data storage device 220 also stores a corporate directory database 260 that records personal information for the users of the distributed network environment 100.

In addition, as discussed further below in conjunction with FIGS. 4 through 7, respectively, the data storage device 220 includes a machine inventory database 400, a BIOS information database 500, a hardware audit table 600, and a machine test results database 700. Generally, the machine inventory database 400 identifies a particular network node 110 using a machine identifier (or serial number), and contains information about the network node 110 as well as personal information about any individuals associated with the network node 110. The BIOS information database 500 contains information obtained by the remote hardware identification process 800, discussed below, during a scan of each network node 110 that can be used in the generation of a BIOS signature. For a discussion of a system and method for identifying the make and model of a network node 110 based on the BIOS signature, see our copending U.S. patent application Ser. No. 09/383,420, entitled "Method and Apparatus for Identifying Computer Hardware Using a Bios Signature." The hardware audit table 600 contains a record for each computer make and model, indexed, for example, by a unique BIOS signature. The machine test results database 700 contains status information for any tests performed by the system management tool (SMT) server 200 on each mobile base station network node 110. For example, to test "Year 2000" compliance, the system management tool (SMT) server 200 may perform a "rollover test," where the date of a given network node 110 is advanced to the end of year 1999 and the system management tool (SMT) server 200 determines if the date rolled over correctly to the year 2000.

In addition, the data storage device 220 includes an inventory and user information scanning process 800, discussed further below in conjunction with FIG. 8, respectively. Generally, the inventory and user information scanning process 800 utilizes the user handle to access a user record from a corporate directory database and links the user information to the scanned inventory information, such as the hardware, software and BIOS information associated with the network node 110. For example, the scanned hardware information may indicate, among other things, the processor type and available memory. The scanned software information may indicate, among other things, the software files installed on the network node 110. The scanned BIOS information may be the information used to generate a BIOS signature associated with the network node 110, discussed below.

Figure 3:
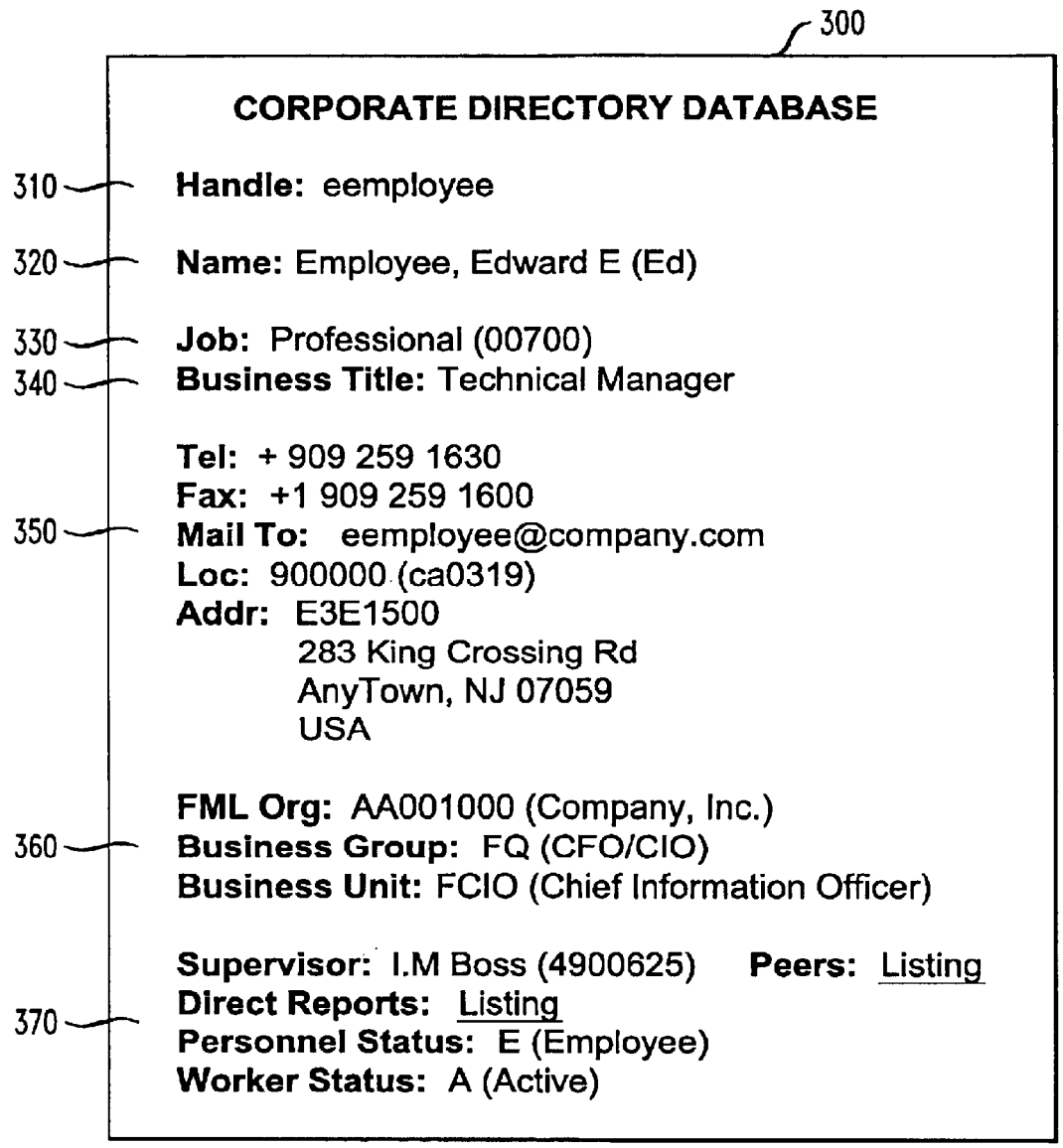
FIG. 3 is a sample record from the corporate directory database of FIG. 2.

FIG. 3 illustrates a representative user record 300, for example, from the corporate directory database 260. As shown in FIG. 3, the representative user record 300 indicates the user handle in field 310, and identifies the name, job title, contact information and affiliations for the associated user in fields 320 through 360, respectively. The contact information may include, for example, address, telephone and electronic mail information. The affiliations information may include any department or business organization affiliations of the user.

FIG. 4 illustrates an exemplary machine inventory database 400 that contains a record for each particular machine connected to the distributed network environment 100. The machine inventory database 400 identifies a particular network node 110 using a machine identifier (or serial number), and contains information about the network node 110 as well as personal information about any individuals associated with the network node 110. The machine inventory database 400 maintains a plurality of records, such as records 405–420, each corresponding to a different network node 110. For each network node 110 identified by a machine identifier in field 440, the machine inventory database 400 indicates the user handle, name, contact information and affiliations for the associated user in fields 450, 460, 470 and 480, respectively. The contact information may include, for example, address, telephone and electronic mail information. The affiliations information may include any department or business organization affiliations of the user. In addition, the machine inventory database 400 indicates the name and IP address of the mobile base station 100 in field 485, as well as information about the processor and operating system of the network node 110 in field 490 and 495, respectively.

FIG. 5 illustrates an exemplary BIOS information database 500 that contains BIOS information that was retrieved from the client BIOS of each network node 110 connected to the distributed network environment 100. The BIOS information database 500 contains information obtained by the remote hardware identification process 800, discussed below, during a scan of each network node 110 and is used in the generation of a BIOS signature, in accordance with the present invention. The BIOS information database 500 maintains a plurality of records, such as records 505–520, each corresponding to a different network node 110. For each network node 110 identified by a machine identifier in field 540, the BIOS information database 500 indicates the BIOS date, machine make/model and BIOS revision in fields 550 through 570, respectively, as obtained from the client BIOS. In addition, the BIOS information database 500 includes the strings that are retrieved from the client BIOS in field 580, and the strings that match desired identifying strings in field 585. The checksum values are placed in field 590, and the final BIOS signature, as calculated by the BIOS signature generation process 900, is recorded in field 595. It is noted that the machine make/model field 560 of the client BIOS is typically not filled in by the computer manufacturer and is thus often blank in the BIOS information database 500

FIG. 6 illustrates an exemplary hardware audit table 600 contains a record for each computer make and model, indexed, for example, by a unique BIOS signature. The hardware audit table 600 maintains a plurality of records, such as records 605–620, each corresponding to a different type of network node 110 (make/model). It is noted that the make of a network node 110 is generally the manufacturer name, and the model is typically a unique number, generally assigned by manufacturer. For each type of network node 110 identified by make and model in fields 640 and 650, respectively, the hardware audit table 600 provides a description of the machine type in field 660, such as a commercial name or trademark, the BIOS signature in field 670 and the compliant status in field 680. Thus, the compliant status field 680 can be used to indicate, for example, the "Year 2000" readiness of the machine type, such as "compliant," "non-compliant," "undetermined." In addition, the hardware audit table 600 provide any recommendations in field notifies one or both of the devices associated with each connection of the new compression scheme, such as any recommended upgrades, or BIOS versions to make the network node 110 compliant. The date of the current BIOS is recorded in field 695.

FIG. 7 illustrates an exemplary machine test results database 700 contains status information for any tests performed by the system management tool (SMT) server 200 on each mobile base station network node 110. For example, to test "Year 2000" compliance, the system management tool (SMT) server 200 may perform a "rollover test," where the date of a given network node 110 is advanced to the end of year 1999 and the system management tool (SMT) server 200 determines if the date rolled over correctly to the year 2000. The machine test results database 700 maintains a plurality of records, such as records 705–720, each corresponding to a different network node 110. For each network node 110 identified by a machine identifier in field 740, the machine test results database 700 indicates the test that was performed in field 750, and the corresponding test result in field 760. For example, field 750 may indicate that a rollover test was performed, and field 760 may indicate the pass/fail status.

It is noted that the 400 machine-specific databases, namely, the machine inventory database 400, BIOS information database 500 and machine test results database 700 are linked using the machine identifier field. The hardware audit table 600, which contains a record for each computer make and model type, is not machine-specific and is therefore not linked to other records using the machine identifier.

PROCESSES

As previously indicated, the system management tool (SMT) server 200 performs a inventory and user information scanning process 800 (FIG. 8) to access a user record from a corporate directory database using the user handle and links the user information to the scanned inventory information, such as the hardware, software and BIOS information associated with the network node 110. As shown in FIG. 8, the inventory and user information scanning process 800 initially prompts the user for the user handle during step 810 as part of log-in process.

Thereafter, the corresponding user record is retrieved from a corporate directory database using the user handle during step 820, and the retrieved user record is presented to the user for verification during step 830. A test is performed during step 840 to determine if the retrieved record is the correct record for this user and if the record contains accurate information.

If it is determined during step 840 that the retrieved record is not the correct record for this user, then the user is prompted to re-enter the user handle and program control returns to step 810 and continues in the manner described above. If, however, it is determined during step 840 that the retrieved record is the correct record for this user, then program control proceeds to step 850, where an inventory scan is executed to obtain, for example, hardware, software and bios information.

The scanned inventory information is recorded during step 860 in one or more records linked to the personal information in the corporate directory database 260. In one embodiment, the scanned inventory information and personal information is recorded in the machine inventory database 400, BIOS information database 500 and machine test results database 700, each linked using a machine identifier. Program control terminates during step 870.

As previously indicated, a system and method for identifying the make and model of a network node 110 based on the BIOS signature, is discussed in our co-pending U.S. patent application Ser. No. 09/383,420, entitled "Method and Apparatus for Identifying Computer Hardware Using a Bios Signature." A system and method for identifying software files using a maintained software audit file is discussed in our co-pending U.S. patent application Ser. No. 09/384,117, entitled "Method and Apparatus for Remotely Assessing Software With Automatic Maintenance of a Software Audit File."

Once the scanned inventory information is linked to the personal information of the user associated with the network node 110, the inventory information may be reported or searched based on user criteria or personal information. For example, if the personal records identify a business group, such as a corporate department, or a geographic location, associated with the corresponding user, the linked inventory and personal information can be searched to identify the number of network nodes 10 in a business group requiring an upgrade, replacement or additional servicing. In addition, the linked inventory and personal information can be searched to identify and report the number of network nodes 110 in a business group that fail to comply with a particular issue, such as the "Year 2000" or "Euro" problems.

It is to be understood that the embodiments and variations shown and described herein are merely illustrative of the principles of this invention and that various modifications may be implemented by those skilled in the art without departing from the scope and spirit of the invention.

We claim:

1. A method for performing an inventory scan of a network node in a distributed computing system, comprising the steps of:
    identifying a user of said network node using a user handle;
    obtaining a user record associated with said identified user;
    scanning said network node for inventory information; and
    associating said scanned inventory information with said user record.

2. The method of claim 1, wherein said user handle uniquely identifies a user in said distributed computing system.

3. The method of claim 1, wherein said user record is obtained from a corporate directory database.

4. The method of claim 1, wherein said user record contains contact information for said user.

5. The method of claim 1, wherein said user record contains affiliation information for said user.

6. The method of claim 5, wherein said affiliation information identifies a business organization affiliation of said user.

7. The method of claim 1, wherein said user record contains location information for said user.

8. The method of claim 1, wherein said inventory information includes information describing hardware of said network node.

9. The method of claim 1, wherein said inventory information includes information describing software installed on said network node.

10. The method of claim 1, wherein said inventory information includes information describing the BIOS of said network node.

11. The method of claim 1, wherein said inventory information is recorded in a record that includes a machine identifier identifying said network node.

12. The method of claim 1, wherein said user record identifies a network node utilized by said user using a machine identifier.

13. The method of claim 1, wherein said associating step comprises the step of linking said user record and said scanned inventory information using a machine identifier.

14. A method for performing an inventory scan of a network node in a distributed computing system, comprising the steps of:
    identifying a user of said network node using a user handle;
    obtaining a user record associated with said identified user;
    verifying that said user record is associated with said user;
    scanning said network node for inventory information; and
    associating said scanned inventory information with said verified user record.

15. The method of claim 14, wherein said user handle uniquely identifies a user in said distributed computing system.

16. The method of claim 14, wherein said user record is obtained from a corporate directory database.

17. The method of claim 14, wherein said user record contains contact information for said user.

18. The method of claim 14, wherein said user record contains affiliation information for said user.

19. The method of claim 18, wherein said affiliation information identifies a business organization affiliation of said user.

20. The method of claim 14, wherein said user record contains location information for said user.

21. The method of claim 14, wherein said inventory information includes information describing the hardware of said network node.

22. The method of claim 14, wherein said inventory information includes information describing the software installed on said network node.

23. The method of claim 14, wherein said inventory information includes information describing the BIOS of said network node.

24. The method of claim 14, wherein said inventory information is recorded in a record that includes a machine identifier identifying said network node.

25. The method of claim 14, wherein said user record identifies a network node utilized by said user using a machine identifier.

26. The method of claim 14, wherein said associating step comprises the step of linking said user record and said scanned-inventory information using a machine identifier.

27. A system for performing an inventory scan of a network node in a distributed computing system, comprising:
    a memory for storing computer readable code; and
    a processor operatively coupled to said memory, said processor configured to;
    identify a user of said network node using a user handle;
    obtain a user record associated with said identified user;
    scan said network node for inventory information; and
    associate said scanned inventory information with said user record.

28. A system for performing an inventory scan of a network node in a distributed computing system, comprising:
    a memory for storing computer readable code; and
    a processor operatively coupled to said memory, said processor configured to:
    identify a user of said network node using a user handle;
    obtain a user record associated with said identified user;
    verify that said user record is associated with said user;

scan said network node for inventory information; and associate said scanned inventory information with said verified user record.

29. A system for performing an inventory scan of a network node in a distributed computing system, comprising:

means for identifying a user of said network node using a user handle;

means for obtaining a user record associated with said identified user;

means for scanning said network node for inventory information; and means for associating said scanned inventory information with said user record.

30. A system for performing an inventory scan of a network node in a distributed computing system, comprising:

means for identifying a user of said network node using a user handle;

means for obtaining a user record associated with said identified user;

means for verifying that said user record is associated with said user;

means for scanning said network node for inventory information; and means for associating said scanned inventory information with said verified user record.

* * * * *

UNITED STATES PATENT AND TRADEMARK OFFICE
CERTIFICATE OF CORRECTION

PATENT NO. : 6,941,361 B1
DATED : September 6, 2005
INVENTOR(S) : Fink et al.

It is certified that error appears in the above-identified patent and that said Letters Patent is hereby corrected as shown below:

Column 2,
Line 61, delete "(SMT)".

Column 3,
Lines 8, 14, 23, 26, 53, 54 and 61, delete "(SMT)".

Column 4,
Lines 25, 28 and 30, delete "(SMT)".

Column 6,
Lines 1, 4, 6 and 30, delete "(SMT)".

Column 7,
Line 57, replace "the" with -- a --.

Column 8,
Lines 29 and 32, delete "the".
Line 35, replace "the" with -- a --.

Signed and Sealed this

Tenth Day of January, 2006

JON W. DUDAS
*Director of the United States Patent and Trademark Office*